United States Patent [19]
Hartzell, Jr.

[11] Patent Number: 5,834,862
[45] Date of Patent: Nov. 10, 1998

[54] LINEAR MOTOR COOLING SYSTEM

[75] Inventor: Robert Eugene Hartzell, Jr., Doylestown, Pa.

[73] Assignee: Kulicke and Soffa Investments, Inc., Wilmington, Del.

[21] Appl. No.: 887,614

[22] Filed: Jul. 3, 1997

[51] Int. Cl.[6] ............................ H02K 41/00; H02K 9/02
[52] U.S. Cl. .................................. 310/12; 310/58; 310/63
[58] Field of Search ................................ 310/12, 13, 14, 310/58, 63

[56] References Cited

U.S. PATENT DOCUMENTS

3,376,578   4/1968   Sawyer ........................................ 310/13
5,258,671  11/1993   Vollenwyder et al. .................... 310/12
5,703,420  12/1997   Kamata et al. ............................ 310/54

*Primary Examiner*—Steven L. Stephan
*Assistant Examiner*—Judson H. Jones
*Attorney, Agent, or Firm*—John B. Sowell Aty

[57] ABSTRACT

A low cost highly efficient cooling system for a closely coupled linear motor includes a moving coil mounted for movement on a stator core. The moving coil comprises a plurality of conductive turns wound on a frame wherein the outer surface of the turns are exposed. A nozzle comprising a base member and a cover plate is mounted on one end of the moving coil for producing a pair of high velocity sheets of air which are directed horizontally over the surface of the exposed turns so as to rapidly cool and stabilize the temperature of the coils wound on the moving coil frame within a very short period of time.

18 Claims, 7 Drawing Sheets

LINEAR MOTOR COOLING SYSTEM

BACKGROUND OF THE INVENTION

1. Field of the Invention

The present invention relates to a system for cooling moving electrical coils of a linear motor. More particularly, the present invention relates to a low mass nozzle which is adapted to be mounted on a moving electrical coil frame for generating a high velocity sheet of air which flows over the coil or coils to be cooled.

2. Description of the Prior Art

Electrical motors when energized to do work create heat. Most rotating electric motors are provided with some form of fan or blading which induces or forces an air flow through the motor to effect cooling. However, linear motors often require very tight coupling between the moving coil and the stator for efficiency, thus, are usually provided with insufficient passageways through which cooling air would flow even if some of the blading was made a part of the moving element. The problem of cooling linear motors becomes more acute when the moving element is not continuously or repetitive moved or the moving coil is highly energized to effect very large accelerating and decelerating forces.

Accordingly, it would be highly desirable to provide a low cost cooling system that is adapted to move a stream of cooling air through a tightly coupled linear motor.

SUMMARY OF INVENTION

It is a principal object of the present invention to provide a low mass cooling system which may be mounted on and move with the moving coil of a linear motor.

It is yet another object of the present invention to provide a novel nozzle system for generating a high velocity sheet of cooling air for a linear motor system.

It is yet another object of the present invention to provide a method and nozzle system for simultaneously cooling the top and bottom surfaces of a moving coil from a single source.

It is a general object of the present invention to provide a low cost highly efficient cooling system for the moving coils of a linear motor.

In accordance with these and other objects of the present invention, a moving coil is mounted in tight coupling to a fixed stator of a linear motor. The moving coil is mounted on a coil frame which supports a low mass nozzle comprising a base member and a cover plate coupled to a source of cooling air. A slot between the base member and the cover plate defines an elongated slot which generates a high velocity sheet of cooling air that is directly over the exposed surface of the moving coils above and below the coil frame.

DETAILED DESCRIPTION OF THE PREFERRED EMBODIMENTS

Figure 1:
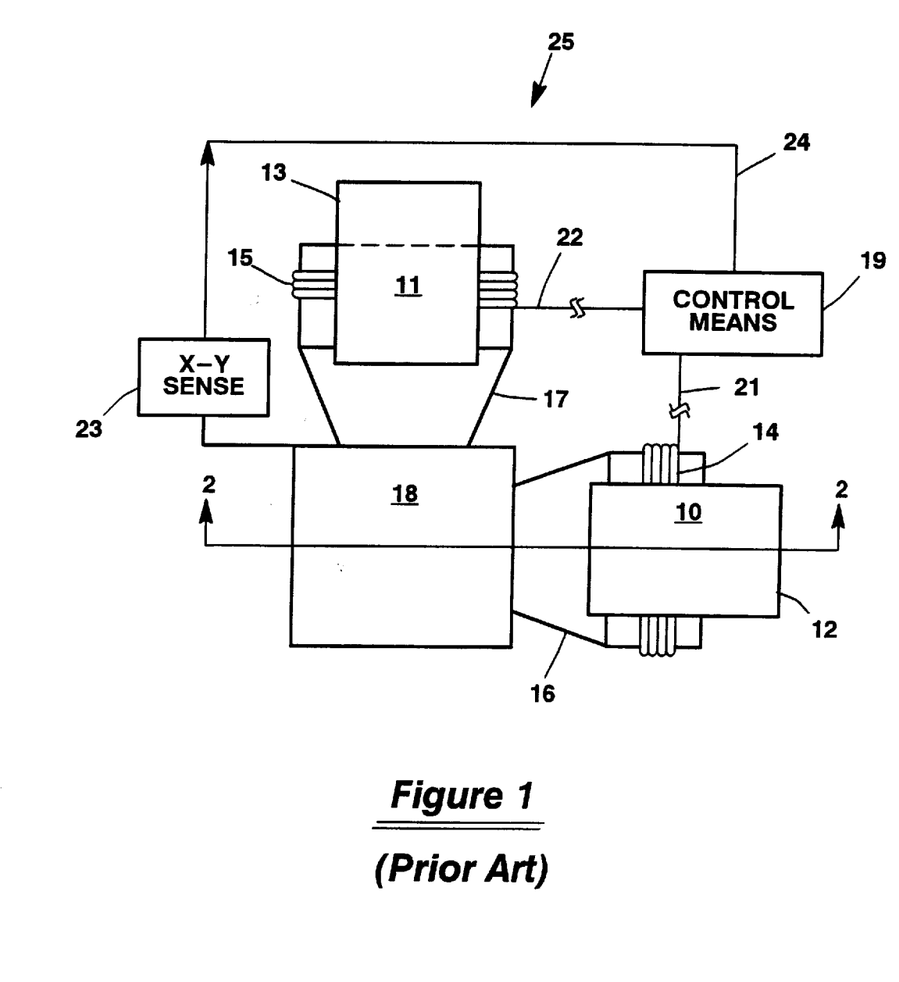
FIG. 1 is a plan view of a prior art linear motor system of the type in which the present invention may be incorporated.

FIG. 1 shows a representative prior art linear motor system of the type used in X-Y stages of wirebonders and diebonders that require very precise and very rapid movements. The bidirectional drive motor system shown in FIG. 1 is described in U.S. Pat. No. 4,808,892 and is assigned to the same assignee as the present invention. This patent is incorporated by reference herein.

FIG. 1 shows a schematic plan view of a pair of linear bidirectional motors 10 and 11 having stators 12 and 13 and open rectangular shaped bi-directional moving coils 14 and 15. Each coil is supported on the respective coil supports 16 and 17 which include coil frames that are connected to an X or a Y stage of the X-Y table 18.

Control means 19 are coupled by flexible electrical wires 21 and 22 to coils 14 and 15 for generating a force field employed to move the X and Y stages independent of each other. In this embodiment, coil 14 only exerts a force in the X direction while coil 15 only exerts a force in the Y direction. Movement of the top stage of table 18 is sensed by sensor 23 and the feedback signals on line 24 form a closed loop prior art positioning system 25.

Figure 2:
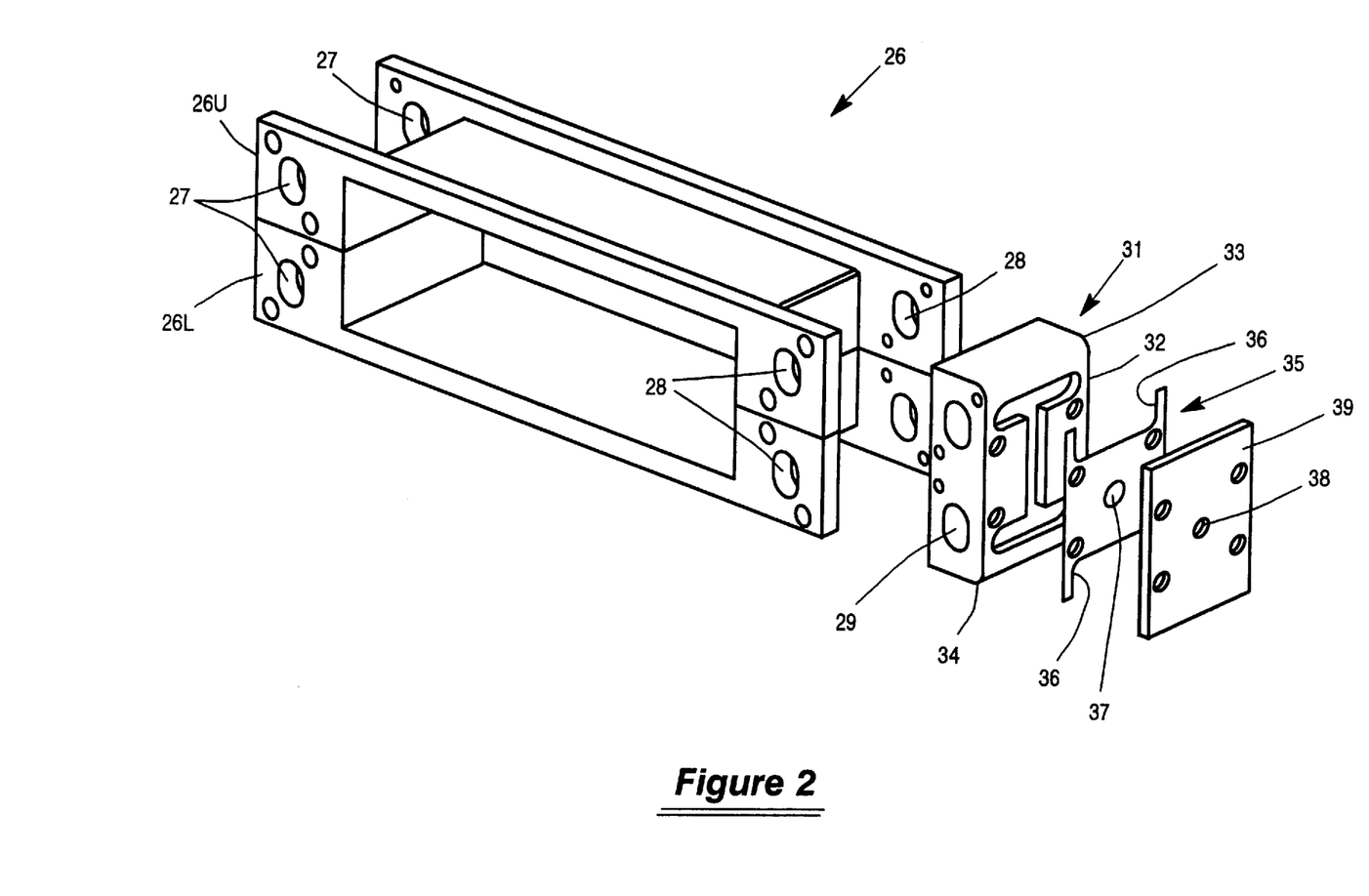
FIG. 2 is an exploded isometric view of a coil frame of the type which embodies the present invention.

Refer now to FIG. 2 showing an exploded isometric view of a coil frame 26 of the type which embodies the present invention. The coil frame 26 is preferably made in two parts for ease of manufacture and is shown as having an upper frame 26U and a lower frame 26L. Apertures 27 in the ends of the frame are used for attachment to the coil supports 16 and 17 by means of bolts (not shown). Similar apertures 28 are shown aligned with apertures 29 in base member 31. The base member 31 has a recessed air chamber 32 and curved air foils 33 and 34 on the surface thereof. A thin shim 35 having U-shaped cutouts 36 fit over and surround the horizontal portion of the air chamber 32 so as to form a highly precise slot having the width of the shim 35 and the thickness of the shim 35. Shim 35 is shown having an air hole 37 which is aligned with the air hole 38 in the back or cover plate 39. Unnumbered screw holes are shown in the cover plate 39 and the base member 31 for attaching them together with the shim 35 therebetween and for attaching the nozzle which comprises base member 31, shim 35 and back plate 39 to the coil frame 26.

Figure 3:
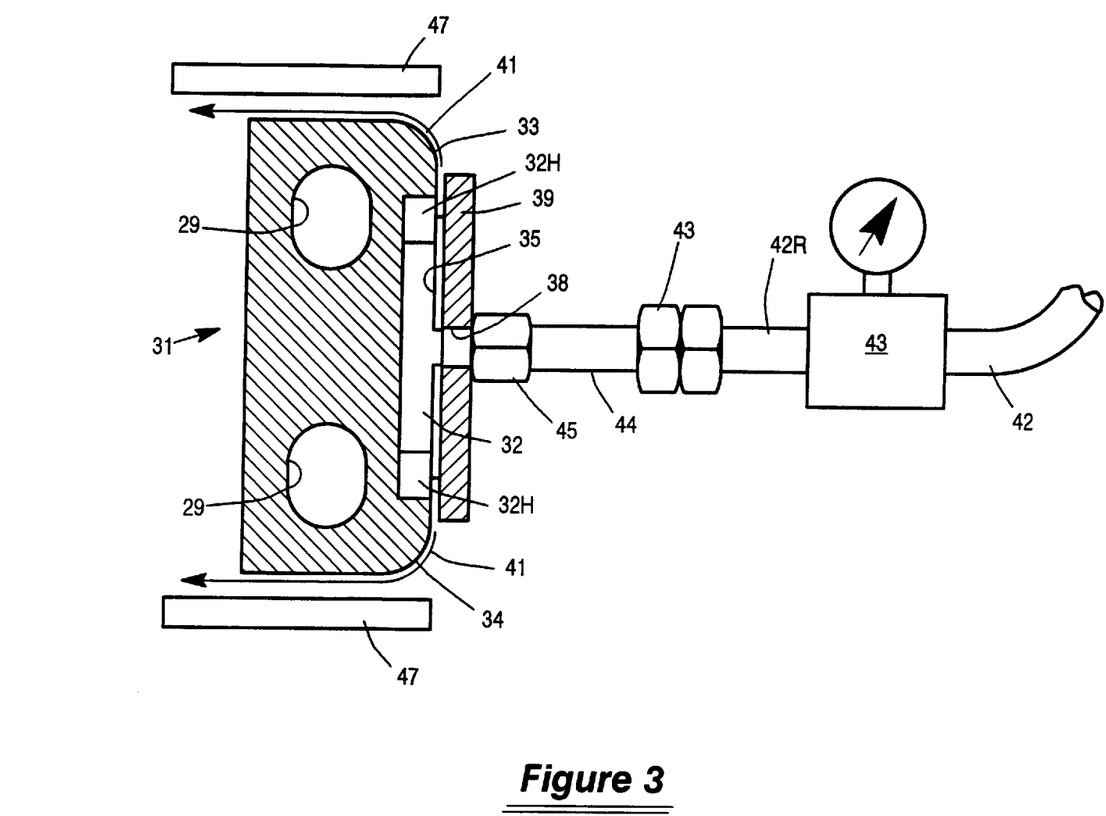
FIG. 3 is a side view in section taken through the center of the coil frame of FIG. 2 showing a vertical to horizontal air flow nozzle.

Refer now to FIG. 3 showing a side view in section taken through the center of the base member 31 showing a vertical/horizontal nozzle. The numerals which are employed in FIG. 3 that are the same as those shown in FIG. 2 are the same in structure and mode of operation and do not require additional explanation. It can be seen that the shim 35 causes the cover plate 39 to be spaced apart from the base member 31 over the horizontal recesses 32H. This space forms an elongated slot having a depth D and a width W which causes a high velocity sheet of air to move vertically then horizontally over the air foils 33 and 34 as shown by the arrows or air streams 41. Any diffusion of the air stream 41 is preferably restricted by baffles 47 which are attached to the coil frame 26. The hole 38 in the cover plate 39 which connects to the chamber 32 is connected to a source of air 42 shown by the flexible line. The source of air first passes through a pressure regulating device 43 which may be a pressure regulating valve or other means and the regulated air on line 42R connects to a standard orifice connection 43 which controls the flow of air to approximately two cubic feet per minute on line 44 which connects to the hole 38 through an adapter 45. It will be understood that the nozzle device has a single source of air and provides two horizontal high velocity air streams 41 which are directed over the electrical coils 14, 15 which are wound onto the coil frame 26.

Figure 4:
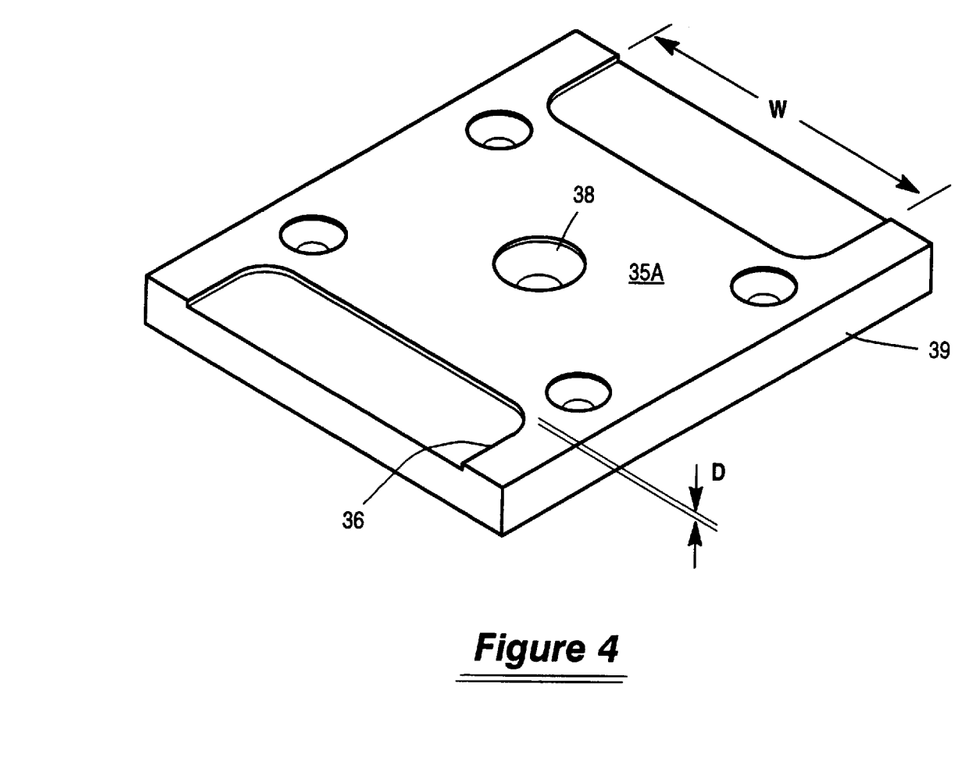
FIG. 4 is an isometric view of a modified cover plate for a nozzle that eliminates the need for a shim shown in FIGS. 2 and 3.

Refer now to FIG. 4 showing an isometric view of a modified cover plate forming a nozzle that eliminates the need for a shim 35. The inside of cover plate 39 is shown having a raised surface 35A identical to the shim 35 shown in FIG. 2. The raised surface 35A is made by machine the U-shaped recesses 36 from the block of material from which the cover plate 39 is made. The U-shaped apertures 36 are shown having a width W and a depth D identical to those described with reference to the shim 35. The air hole 38 which communicates with the adapter 45 and the recess air chamber 32 is the same as that described previously. The back plate or cover plate is shown having unnumbered apertures for screws which connect it to the base member 31.

Figure 5:
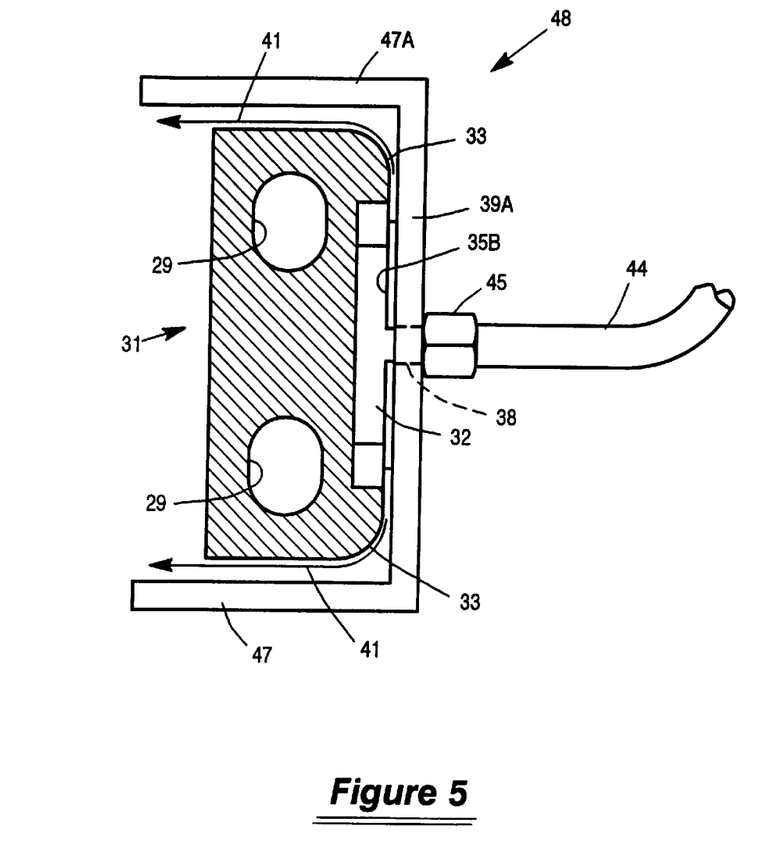
FIG. 5 is a side view in section taken through a two piece nozzle having nozzle slots for directing a thin sheet of cooling air in a horizontal direction.

Refer now to FIG. 5 showing a side view in section taken through a two-piece nozzle 48. The two-piece nozzle 48 is shown comprising a base member 31 and a back or cover plate 39A which further comprises baffles 47A. The shim 35B is indicative of a shim like shim 35 or a raised surface like 35A. The remaining numbers on FIG. 5 are identical to those shown and described with reference to FIG. 3 and the mode of operation is the same. It will be noted that the two-piece nozzle produces an air flow which starts vertically and is directed horizontally over air foils 33 to provide a horizontal thin sheet of air 41 which passes completely through the stators 12, 13 as explained hereinbefore to produce the novel cooling effect.

Figure 6:
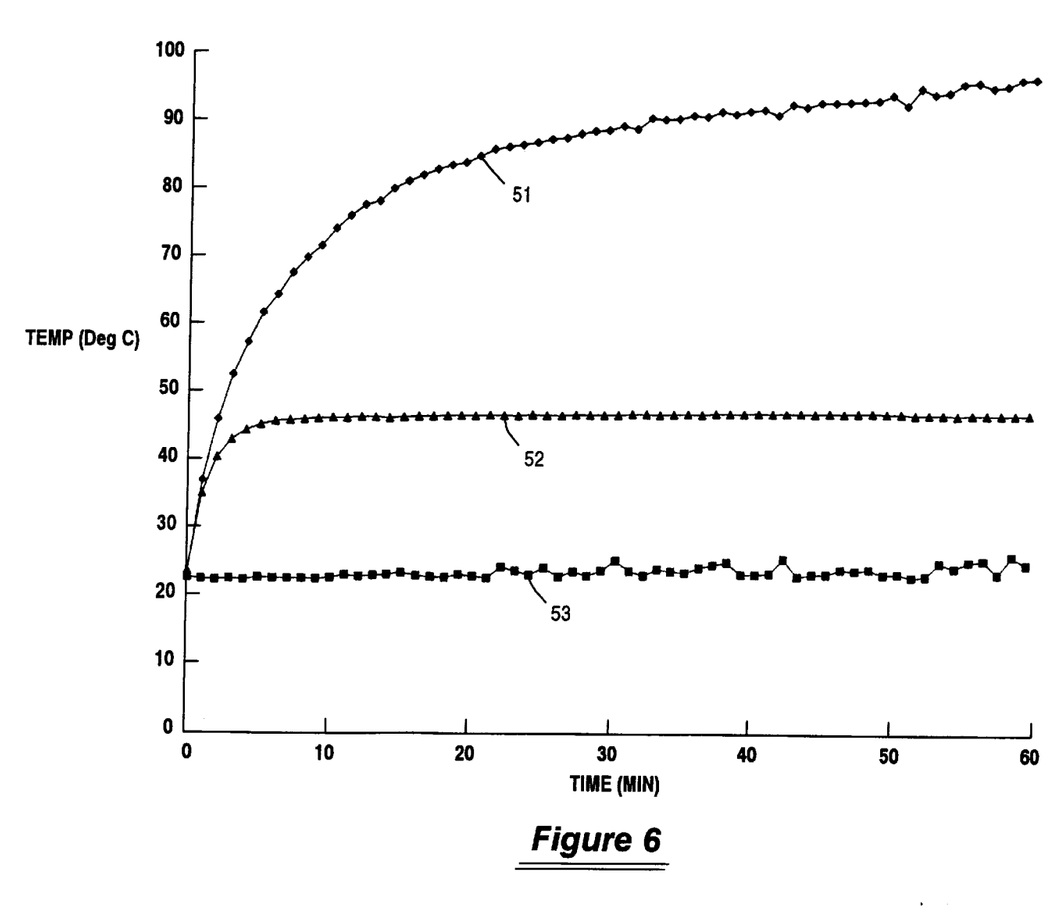
FIG. 6 is a waveform chart showing the rise in temperature in the coil that occurs with and without the present invention cooling system.

Refer now to FIG. 6 showing a chart or waveforms that are employed to explain the rise in temperature that occurs in the coils with and without the present system invention. Waveform 51 shows that the coil 14 or 15 starts at an ambient temperature of approximately 20° C. and rises rapidly for the first twenty minutes to a temperature of around 85° C. and then continues to rise for another forty minutes and is not stabilized after sixty minutes. This instability of the coils 14 and 15 has a detrimental affect on heating other parts of a wirebonder or diebonder as the case may be. FIG. 6 shows that with the present invention waveform 52 stabilizes the temperature of the moving coils 14 and 15 in less than ten minutes and maintains the stabilized temperature during operation. The two waveforms 51 and 52 were produced by embedding sensors in the coils while energizing the coils to simulate actual operations. The waveforms 51 and 52 were made with a flow of ambient air around 23° to 24° C. having a flow rate of 1.0 to 1.6 cubic feet per minute (cfm). The orifice 43 is employed to maintain a flow rate of approximately 1.2 cfm nominal flow.

Figure 7:
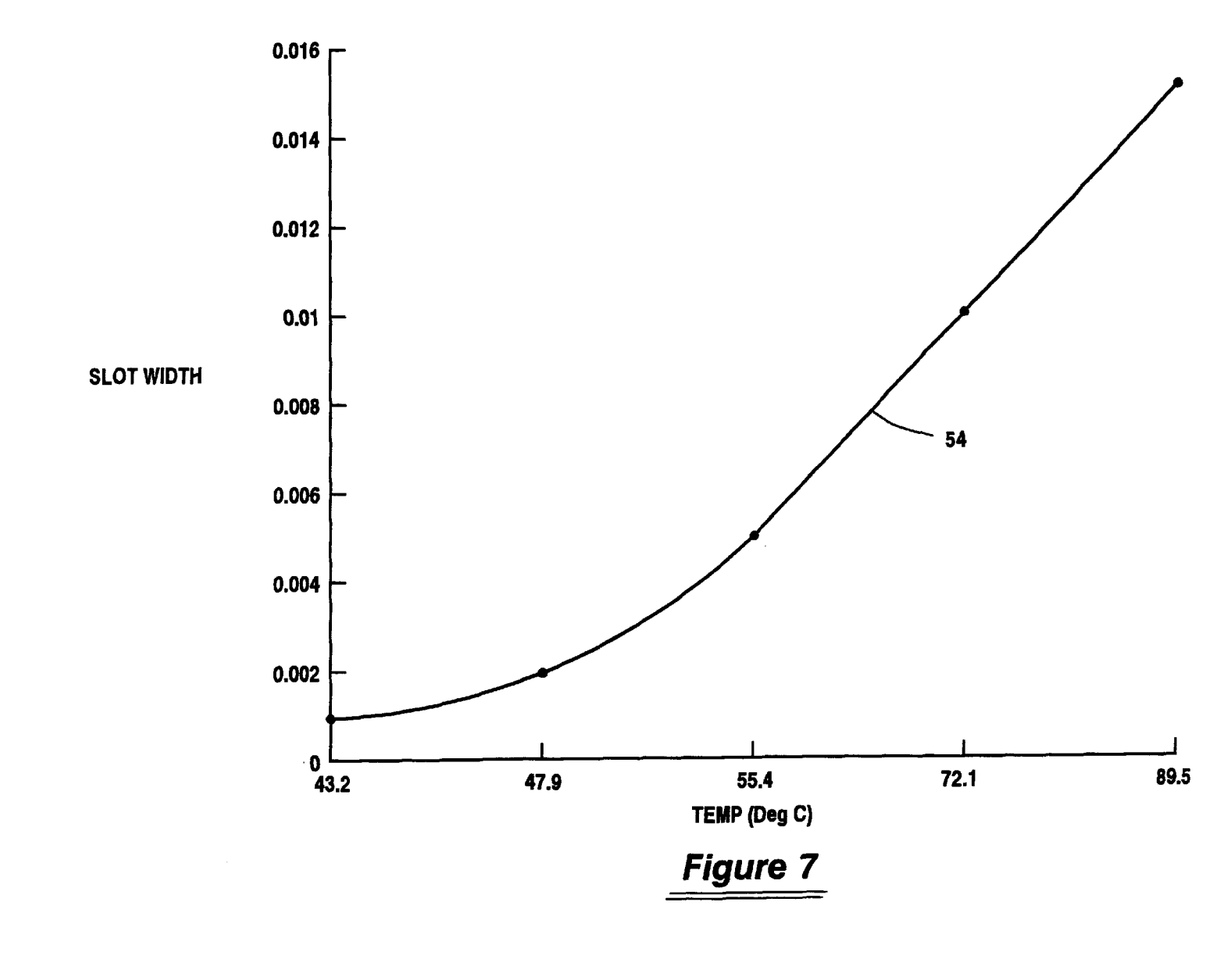
FIG. 7 is a waveform chart showing how an optimum slot depth or width affects the stabilized temperature of the coil.

Refer now to FIG. 7 showing a waveform or chart of temperature versus the depth or thickness of the slot which can be optimized to effect a stabilized temperature of the coils 14 and 15. When the gap or thickness of the shim which defines the nozzle was approximately 15 mils the coil temperature raised to approximately 90° C. However, when the gap or depth of the slot was reduced to approximately 10 mils the temperature of the coils dropped to approximately 72° C. The third point on the curve shows that the when the slot is reduced to approximately 5 mils the temperature continues to drop linearly to approximately 55° C. However, further reduction of the slot to 2 mils and then to 1 mil shows that the curve is becoming flat and the temperature of the coils stabilizes between 2 and 1 mil at approximately 43° C. It can be concluded from the examination of waveform 54 that making the slots narrow so as to produce a high velocity sheet of cooling air produces a greater cooling effect than having a larger gap or depth slot with a lower velocity air flow.

Having explained a preferred embodiment nozzle having low mass that may be mounted on and made a part of the moving coils 14 and 15 it will be appreciated that the small moving mass of the nozzle more than compensates for its increased load on the system. Prior art jets which are directed from cooling fans do not continuously flow over the exposed coils nor would passageways drilled in the stator accomplish the same effective cooling as the novel nozzles which move with the coils.

I claim:

1. A cooling system for a linear motor, comprising:
  a linear motor having a fixed permanent magnetic stator core,
  a moving coil mounted for movement in said stator core,
  said moving coil comprising a plurality of electrically conductive turns wound on a coil frame with the outer surface of the turns exposed,
  nozzle means mounted on one end of said coil frame for movement therewith,
  said nozzle means comprising elongated slots for generating high velocity sheets of air directed across the outer surface of said turns, and
  said nozzle means having an air hose adapter for connection to a source of cooling air.

2. A cooling system as set forth in claim 1 wherein said elongated slots are connected to an air chamber in said nozzle means and said sheets of air are directed in a horizontal direction across the exposed horizontal surface of said turns.

3. A cooling system as set forth in claim 2 wherein said elongated slots are directed in a vertical direction.

4. A cooling system as set forth in claim 2 wherein said elongated slots are directed in a vertical direction, and
  air foil means on said nozzle means for directing sheets of air starting in a vertical direction and proceeding in a horizontal direction across said turns.

5. A cooling system as set forth in claim 1 wherein said nozzle means comprises a base member having an air chamber recess therein,
  a cover plate mounted on said base member over said air chamber recess and providing said elongated slots along an edge portion of said cover plate.

6. A cooling system as set forth in claim 5 wherein said cover plate is provided with a pair of elongated recesses which are of a length and depth which defines said elongated slots.

7. A cooling system as set forth in claim 5 which further includes a space fitted between said cover plate and said base member,
  said cover plate being provided with a pair of elongated recesses which are of a length and depth which defines said elongated slots.

8. A cooling system as set forth in claim 1 which further includes a source of cooling air and means for regulating the pressure of said source of said cooling air.

9. A cooling system as set forth in claim 8 wherein said means for regulating the pressure of said source of cooling air comprises, a pressure regulating valve, and a calibrated flow regulating orifice connected in series with said source of cooling air and said pressure regulating valve.

10. A cooling system as set forth in claim 1 wherein said nozzle means comprises a base member and a cover plate, said cover plate being spaced apart from said base member forming said elongated slots.

11. A cooling system as set forth in claim 10 wherein said nozzle means further comprises spacer means for spacing said base member apart from said cover plate.

12. A cooling system as set forth in claim 11 wherein said spacer means comprises a shim having the same thickness or depth as the elongated slots.

13. A cooling system as set forth in claim 11 wherein said spacer means comprises a formed raised surface on said base member cover plate which defines the depth of said elongated slots.

14. A cooling system as set forth in claim 11 which further includes an air foil on said base member for directing said sheets of air horizontally.

15. A cooling system as set forth in claim 14 which further includes a baffle plate for redirecting air flow in a horizontal direction.

16. A cooling system as set forth in claim 10 wherein said cover plate comprises means for forming said elongated slots and means for redirecting said air flow.

17. A cooling system as set forth in claim 1 wherein said elongated slot means comprises a slot having a depth or gap from approximately 1 mil to approximately 4 mils.

18. A cooling system as set forth in claim 17 wherein source of cooling air includes a pressure flow regulator for regulating the flow of air between 1 and 3 cubic feet per minute.

* * * * *